US006230575B1

(12) United States Patent
Berger

(10) Patent No.: US 6,230,575 B1
(45) Date of Patent: May 15, 2001

(54) GEAR TRANSMISSION WITH STEPLESS ADJUSTABLE TRANSLATION

(76) Inventor: Matthias Berger, Wilhelm-Kulz-Strasse 3, D-99423 Weimar (DE)

( * ) Notice: Subject to any disclaimer, the term of this patent is extended or adjusted under 35 U.S.C. 154(b) by 0 days.

(21) Appl. No.: 09/542,075

(22) Filed: Apr. 3, 2000

Related U.S. Application Data

(63) Continuation-in-part of application No. PCT/DE98/02901, filed on Sep. 28, 1998.

(30) Foreign Application Priority Data

Oct. 1, 1997 (DE) .............................................. 197 43 483

(51) Int. Cl.$^7$ ................................................... F16H 25/06
(52) U.S. Cl. .................................... 74/63; 74/53; 74/569; 74/834
(58) Field of Search ................................... 74/53, 63, 66, 74/69, 117, 119, 124, 569, 833, 834

(56) References Cited

U.S. PATENT DOCUMENTS

| 1,911,156 | * | 5/1933 | Laing | 74/119 |
|---|---|---|---|---|
| 2,245,352 | * | 6/1941 | Moessinger | 74/119 |
| 2,929,255 | * | 3/1960 | Colinet | 74/119 |
| 2,997,888 | * | 8/1961 | Rust, Jr. | 74/119 |

FOREIGN PATENT DOCUMENTS

| 474205 | 3/1929 | (DE) . |
|---|---|---|
| 2137724 | 10/1984 | (GB) . |

* cited by examiner

Primary Examiner—Allan D. Herrmann
(74) Attorney, Agent, or Firm—Horst M. Kasper

(57) ABSTRACT

The invention relates to a transmission gear with a steplessly adjustable translation for converting rotation speeds and torques between two shafts. Such converters are employed in all areas of the drive technology, as for example in machine tools and vehicle drives. The transmission gear according to the present invention allows a uniform motion transfer from the drive shaft to the driven shaft while simultaneously inducing substantially less wear appearances at its function determining transmission gear elements, in particular of the transmission gear part system at the side of the driven shaft. Means are furnished for reducing wear, which means superpose an additional motion influencing the speed of the driven shaft only unsubstantially to the translation motions of the translation device.

11 Claims, 5 Drawing Sheets

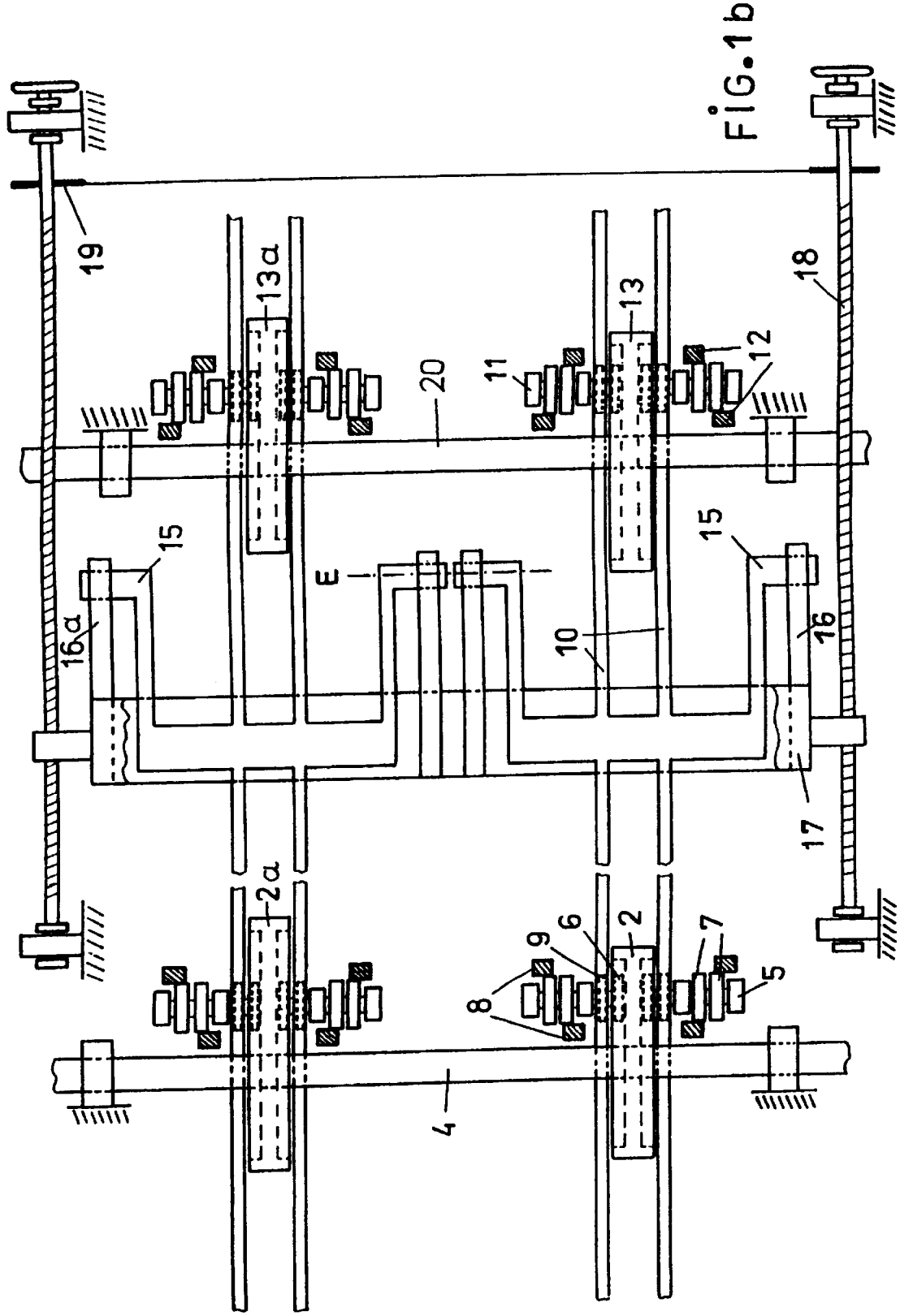

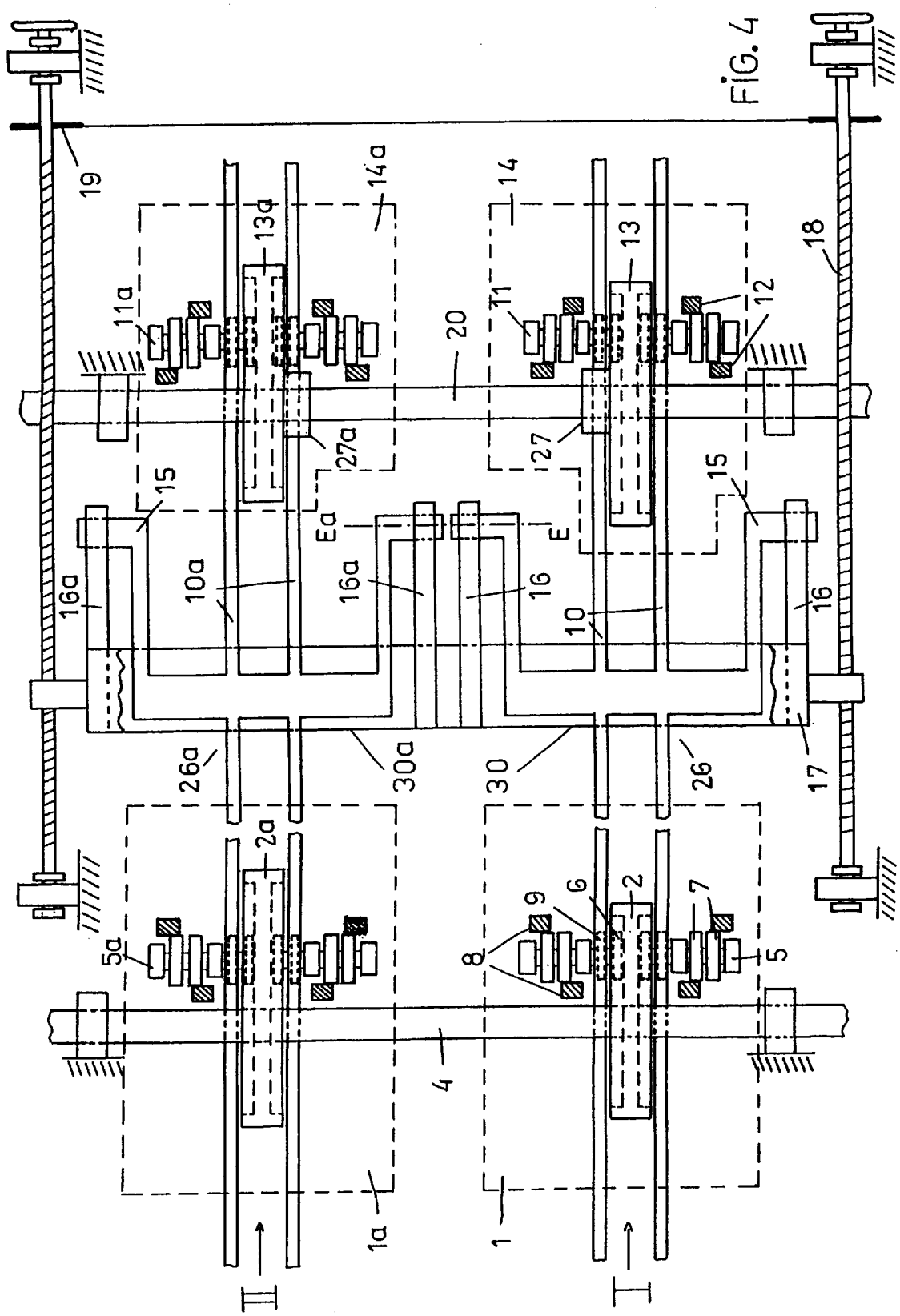

GEAR TRANSMISSION WITH STEPLESS ADJUSTABLE TRANSLATION

CROSS-REFERENCE TO RELATED APPLICATIONS

This application is a continuation-in-part application of another international application filed under the Patent Cooperation treaty Sep. 28, 1998, bearing application Ser. No. PCT/DE98/02901, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The invention relates to a gear transmission with stepless adjustable translation ratio for converting rotational speeds and torques between two shafts.

2. Brief Description of the Background of the Invention Including Prior Art

Such converters represented by gear transmissions with stepless adjustable translation are employed in the complete motive power engineering, in particular in connection with machine tools as with vehicle engines.

Such a gear transmission is known as a variation of ratchet gear or ratchet mechanism drives from the German patent 474205. A gear transmission is proposed there, wherein the rotational motion of the drive shaft is transformed by way of several cam disks disposed on the driving shaft into a back and forth motion of push rods and by intermediate positioning of a variable translation device into a back and forth motion of gear racks, wherein the gear racks in the following successively operate on the driven shaft and drive the driven shaft through gear wheels and blocking couplings (free engine clutch). The variable translation device comprises a two armed lever with adjustable hinge point for changing the in each case effective lever lengths and thus also transmission ratio size. The gear racks move with uniform speed during the force transmission phase and are thus able to drive the driven shaft with a uniform angular speed. The motion transfer in the device according U.S. Pat. No. 4,565,105 occurs in a similar way.

A substantial deficiency of such gear transmission systems comprises that the wear appearances occurring during the transforming of the translational motion into a rotational motion of the driven shaft, for example, the back and forth motion of the gear racks to a rotational motion of the gear wheel in the gear rack/gear wheel drive, are of substantial size in particular in continuous operation and can interfere substantially with the reliability of the overall gear transmission. The wear appearances concern in particular those regions of the toothed wheel work of the gear rack and gear wheel, which are subjected more frequently to a particularly large mechanical load during the periodical loading in continuous operation as compared to other regions. However the wear occurring also upon employing cam drive gear mechanisms as a second force transmission means in the regions between engagement members and cam members and their guide tracks or, respectively, between engagement members is not negligible. The non-uniform distribution of the material abrasion by wear based on the non-uniform load of the stroke distance available of the gear rack or, respectively, of the engagement member is further increased in that the force to be transmitted increases, based on the increase of the translation setting (decrease of the length of the stroke distance) under the condition of constant transmission power. The strong and in particular also non-uniform wear at the function determining contact faces of the gear transmission elements of the second force transmission means transferring the motion is, however, associated with deviations from the desired relative motion of the gear transmission means, which in turn are the cause for a rapidly advancing wear process.

SUMMARY OF THE INVENTION

1. Purposes of the Invention

Therefore it is an object of the present invention to furnish a gear transmission with continuously changeable translation ratio with a transmission of the motion as uniform as possible, wherein the reliability and the operational life of the overall gear transmission can substantially be increased by a substantially decreased wear at function determining contact faces, in particular of the driven side gear transmission part system (second force transmission means).

These and other objects and advantages of the present invention will become evident from the description which follows.

2. Brief Description of the Invention

The present invention allows a uniform transfer of motion from the drive shaft to the driven shaft. It is characterized by substantially reduced wear occurrences at function determining gear transmission elements. The steplessly adjustable gear transmission comprises at least two staggered operating gear transmission units, which transfer the rotational motion of the drive shaft intermittently for in each case a time period (force transmission phase) onto the driven shaft. The uniform rotational motion of the drive shaft in each gear transmission unit is here transformed in the force transmission phase by a first force transmission means into a first uniform translational motion, this motion is transformed into a second uniform translational motion (stroke) with a speed depending on the translation setting by a changeable translation device (26) and this translational motion (stroke) is transformed into a uniform rotational motion by the second force transmission means, wherein the uniform rotational motion in turn can be transmitted to the driven shaft by an automatic switching or switching coupling.

The transmission gear with the steplessly adjustable translation comprises a drive shaft, a driven shaft, at least a first gear transmission unit and a second gear transmission unit.

The first gear transmission unit includes a first force transmission means wherein the first force transmission means transforms a first uniform rotary motion of the drive shaft into a first uniform translation motion during a first force transmission phase, a first changeable translation device, wherein the first changeable translation device converts the first uniform translation motion into a second uniform translation motion with a speed depending on the translation setting during the first force transmission phase while the translation setting is maintained at a constant value, and a second force transmission means and wherein the second force transmission means transforms the second uniform translation motion into a second rotary uniform motion during the first force transmission phase while the translation setting is maintained at a constant value.

The second gear transmission unit includes a third force transmission means wherein the third force transmission means transforms the first uniform rotary motion of the drive shaft into a third uniform translation motion during a second force transmission phase, a second changeable translation device, wherein the second changeable translation device converts the third uniform translation motion into a fourth uniform rectilinear motion with a speed depending on the translation setting during the second force transmission phase while the translation setting is maintained at a constant value, and a fourth force transmission means and wherein the fourth force transmission means transforms the fourth uniform translation motion into a third uniform rotary motion while the translation setting is maintained at a constant value during the second force transmission phase.

Switching or automatic switching couplings are employed, wherein the switching or automatic switching couplings transfer the second uniform rotary motion and the third uniform rotary motion to the driven shaft. Additional means shift the region used for the second uniform translation motion within the complete stroke distance usable for the second translation motion of the second force transmission means and shift the region used for the forth uniform translation motion within the complete stroke distance usable for the fourth translation motion of the fourth force transmission means during the running of the transmission gear with a speed influencing the driven motion only unsubstantially, wherein the rotary motion of the drive shaft is sequentially and intermittently transferred to the driven shaft by the first gear transmission unit and, respectively, by the second gear transmission unit for in each case a respective time interval during a respective force transmission phase.

The first changeable translation device can comprise a translation set unit including a threaded spindle, a frame parallel shiftable by way of the translation set unit and wherein the frame is fixable in a preselected position, bearing supports guided by the frame, a first lever system having a hinge point, wherein the first lever system is rotatably supported on the bearing support and wherein first the lever system is furnished with first lever rails;

a first stroke element associated with the first force transmission means for engaging into the first lever rails, wherein the first stroke element is guided in a first straight line motion track, a second stroke element associated with the second force transmission means for engaging into the first lever rails, wherein the second stroke element is guided in a second straight line motion track, wherein the first straight line motion track and the second straight line motion track are disposed parallel to each other. The frame with the bearing support is constructed such shiftable by the translation set unit such that the ratio of the distances between the hinge point of the first lever system and the first straight line motion track and the second straight line motion track is steplessly changeable. The additional means can comprise guide tracks in the frame, wherein the guide tracks guide the bearing supports shiftable in a straight line wherein this straight line and the straight line motion tracks of the stroke elements are disposed parallel to each other, an oscillating crank loop is driven by the drive shaft for additionally moving and positioning the bearing support within its guide tracks in the frame.

The second changeable translation device can comprise a translation set unit including a threaded spindle, a frame parallel shiftable by way of the translation set unit and wherein the frame is fixable in a preselected position, bearing supports guided by the frame, a second lever system having a hinge point, wherein the second lever system is rotatably supported on the bearing support and wherein the second lever system is furnished with second lever rails. A third stroke element is associated with the third force transmission means for engaging into the second lever rails, wherein the third stroke element is guided in a third straight line motion track, a fourth stroke element is associated with the fourth force transmission means for engaging into the first lever rails, wherein the fourth stroke element is guided in a fourth straight line motion track, wherein the third straight line motion track and the fourth straight line motion track are disposed parallel to each other.

The frame with the bearing support is such shiftable by the translation set unit such that the ratio of the distances between the hinge point of the second lever system and the third straight line motion track and the fourth straight line motion track is steplessly changeable.

An additional means of the second gear transmission unit can comprise guide tracks in the frame, wherein the guide tracks guide the bearing supports shiftable in a straight line wherein this straight line and the straight line motion tracks of the stroke elements are disposed parallel to each other, an oscillating crank loop is driven by the drive shaft for additionally moving and positioning the bearing support within its guide tracks in the frame. The solution of the object under employment of a gear transmission for stepless rotational speed conversion of the initially recited kind is furnished by performing a continuous transposition of the region used for the stroke within the usable stroke distance of the second force transmission means and fourth force transmission means, respectively, during the running of the gear transmission. If for example a lever system is employed as a translation device, then a continuous transposition of the wear regions and thus on the driven side a more uniform wear of the flanks of the teeth or, respectively of the flanks of the curves of the cam member can be achieved according to the present invention by an additional motion of the hinge point of the lever system in parallel to the motion paths of the stroke elements of the force transmission means. This superposition motion is performed with a speed influencing the driven motion only unsubstantially.

The invention is to be explained in more details by way of an embodiment as well as the schematic drawings associated therewith. The description provided always presupposes that the translation setting is maintained just constant over the time periods considered here and that the drive shaft rotates uniformly.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention:

FIG. 1b is a top elevational view of a schematic diagram illustrating the gear transmission of the embodiment of FIG. 1a, including the first gear transmission unit and the second gear transmission unit having the same construction

FIG. 4 is a top elevational view of a schematic diagram illustrating a gear transmission similar to that shown in FIG. 1b.

DESCRIPTION OF INVENTION AND PREFERRED EMBODIMENT

Figure 1A:
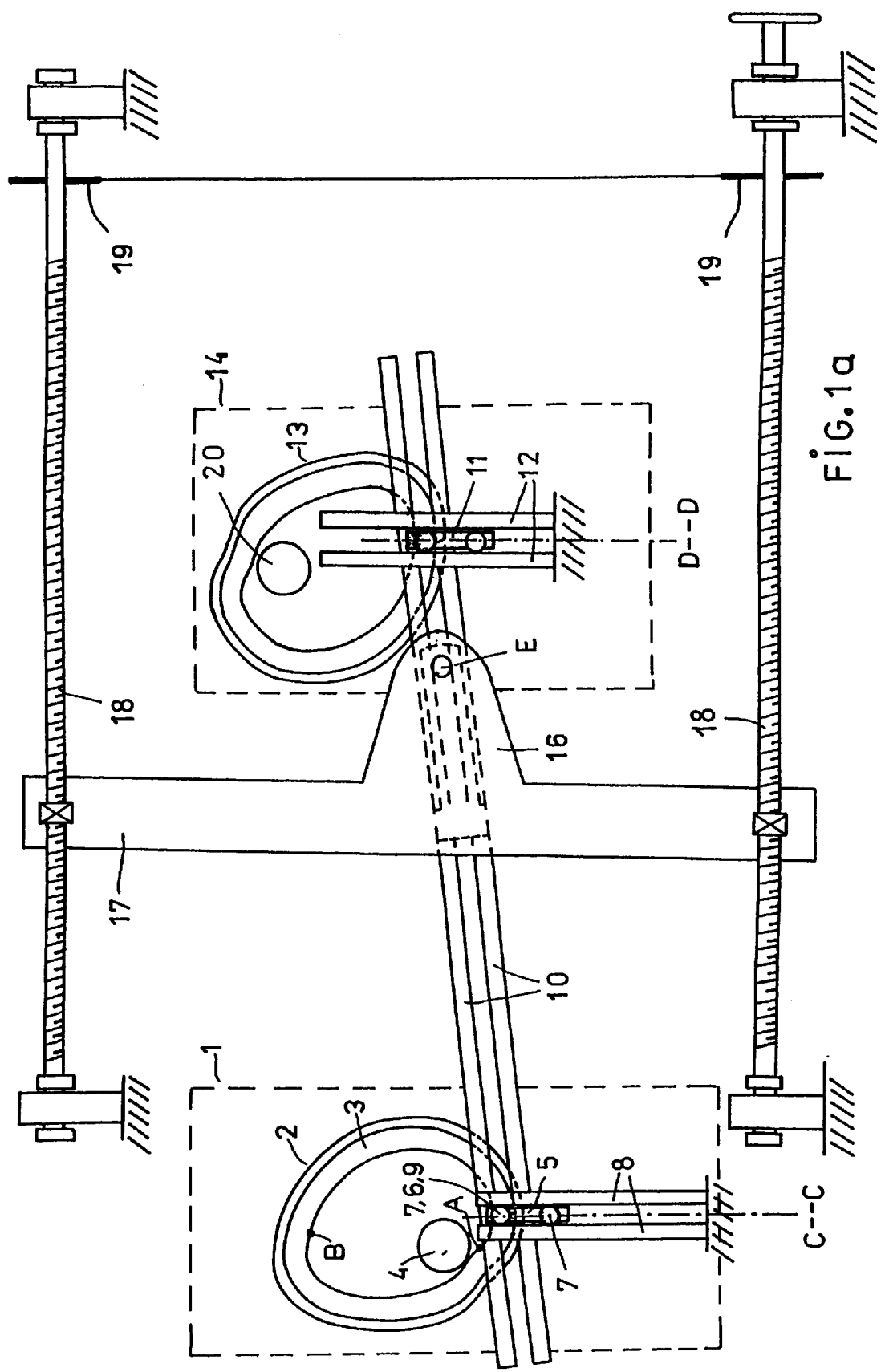
FIG. 1a is a side elevational view of a schematic diagram illustrating one gear transmission unit of two gear transmission units having the same construction, wherein the gear transmission unit employs planar cam disks on the drive side and on the driven side and a lever system for motion transfer and translation setting without applying the invention feature for wear reduction.

A gear transmission is schematically illustrated in FIGS. 1a and 1b, wherein the gear transmission units (I–II) are disposed next to each other in axial direction. A first gear transmission unit (I) includes a first force transmission means 1, a first changeable translation device 26, a second force transmission means 14, and a first automatic switching or switching coupling 27. A second gear transmission unit (II) includes a third force transmission means 1a, a second changeable translation device 26a, a fourth force transmission means 14a, a second switching coupling 27a, and additional means (21, 22, 23, 24). The gear transmission can further comprise a frame 17', a first set of guide tracks 25, a first set of bearing supports 16, a first set 30 of lever systems 10 having a first hinge point E, a first stroke element 5, wherein the first stroke element 5 is guided in a first straight line motion track C—C, a second stroke element 11, wherein the second stroke element 11 is guided in a second straight line motion track D—D, a second set of guide tracks 25a, a second set of bearing supports 16a, a second set 30a of lever systems 10a having a second hinge point Ea, a third stroke element 5a, and a fourth stroke element 11a. However only one of the two equally constructed gear transmission units is shown in FIG. 1a for purposes of surveyability and clarity. A first planar cam gear transmission with a curved cam as curved member 2 is employed as a first force transmission means 1, wherein the curved member 2 is furnished on two sides with a groove curve 3. The curve member is connected to a drive shaft 4 fixedly against rotation. The curve flank of the groove curve has the shape of an involute of a circle in the load region, that is in the figure the region between position A and position B while the disk rotates to the right. A lift slider with curve rollers 6 serves as an engagement member 5. The engagement member is led with rollers 7 along the guide rails 8 in a guide track C—C along a straight line. The motion of the lift slider is transferred to a lever system with lever tracks 10 with the aid of lever rail rollers 9, wherein the lever rail rollers 9 are supported on the same axes as the curve rollers 6 in the embodiment. The rotatable supported lever system moves a lift slider, wherein the lift slider serves as an engagement member 11 for a second force transmission means 14. The lift slider is of the same construction as the engagement member 5 and is led by guide rails 12 in a guide track D—D, wherein the guide track 12 runs parallel to the guide track C—C and the guide rails 8. The lift slider drives with its curve roller the curve member 13 of the force transmission means 14, which is constructed analogously to the curve member 2 and which performs rotary oscillations. The sections of uniform rotary motion of the rotary oscillations are transferred to the driven shaft 20 in each case during the force transmission phase through an automatic switching or switching coupling not illustrated here. The rotary support of the lever system is performed in bearing supports 16 by axle journal stubs 15 disposed staggered by crimping: A second planar cam gear transmission with a curved cam as curved member 2a is employed as a second force transmission means 1a, wherein the second curved member 2a is furnished on two sides with a groove curve. A lift slider with curve rollers serves as a second engagement member 5a. The motion of the lift slider is transferred to a lever system with second lever tracks 10a with the aid of lever rail rollers, wherein the lever rail rollers are supported on the same axes as the curve rollers in the embodiment. The rotatable supported lever system moves a lift slider, wherein the lift slider serves as a second engagement member 11a for a second force transmission means 14a. The lift slider is of the same construction as the second engagement member 5a and is led by guide rails of a fourth force transmission means in a guide track D—D, wherein the guide rails of the fourth force transmission means run parallel to the guide track C—C and the guide rails of a third force transmission means. The lift slider drives with its curve roller the fourth curve member 13a of the second force transmission means 14a, which is constructed analogously to the third curved member 2a and which performs rotary oscillations. The rotary support of the lever system is performed in second bearing supports 16a by axle journal stubs disposed staggered by crimping. The bearing supports are attached to a frame 17, wherein the frame 17 is shifted relative to the casing and can be fixed in the preselected position. The rotation of the threaded spindles occurs always in the same sense and by in each case the same amount, for example under employment of a chain drive 19.

The engagement member 5 performs an oscillating straight line motion under the precondition of a uniform rotary motion of the drive shaft 4, which oscillating straight line motion represents a uniform motion independent of the translation setting during the force transmission phase. In contrast, the engagement member 11 performs an oscillating straight line motion, wherein the oscillating straight line motion is uniform during the force transmission phase and the (constant) speed of the oscillating straight line motion depends on the translation setting in each case. The translation ratio is determined by the ratio of the effective lever lengths of the lever system. The ratio of the effective lever lengths in turn is defined by the ratio of the distances between the hinge point E of the lever system and the guide tracks C—C, D—D of the engagement members. The distances are defined by the positioning of the frame 17, with the aid of threaded spindles 18, since the frame 17 supports the bearing supports 16 for the rotatable support of the lever system. Therefore the translation ratio can be steplessly adjusted by turning the threaded spindles and can assume any desired predetermined value within certain limits. The staggered arrangement of the axle stubs allows to shift the hinge point E of the lever system to the guide track D—D and also beyond that. The driven rotation speed can be lowered thereby up to the value zero and also a reverse of the direction of rotation of the driven shaft 20 (with unchanged drive direction) can be performed when equipped with suitable couplings.

The engagement member of the first or second force transmission means does not have to be simultaneously also the lift element as described above, which lift element engages into the lever tracks 10 of the lever system. The engagement member and the lift element can also be of different construction parts, wherein a force transmission is performed between the different construction parts.

Also chain drives or toothed wheel—toothed rack gear transmissions can be employed instead of curve gear transmissions as a first force transmission means or as a second force transmission means. When employing a toothed wheel—toothed rack transmission gear as a first force transmission means, in fact part of the toothing of the wheel, has to be left open and a device for a return motion of the toothed rack has to be provided. Advantageously a toothed wheel—toothed rack transmission gear, is employed as a second force transmission means.

Figure 2:
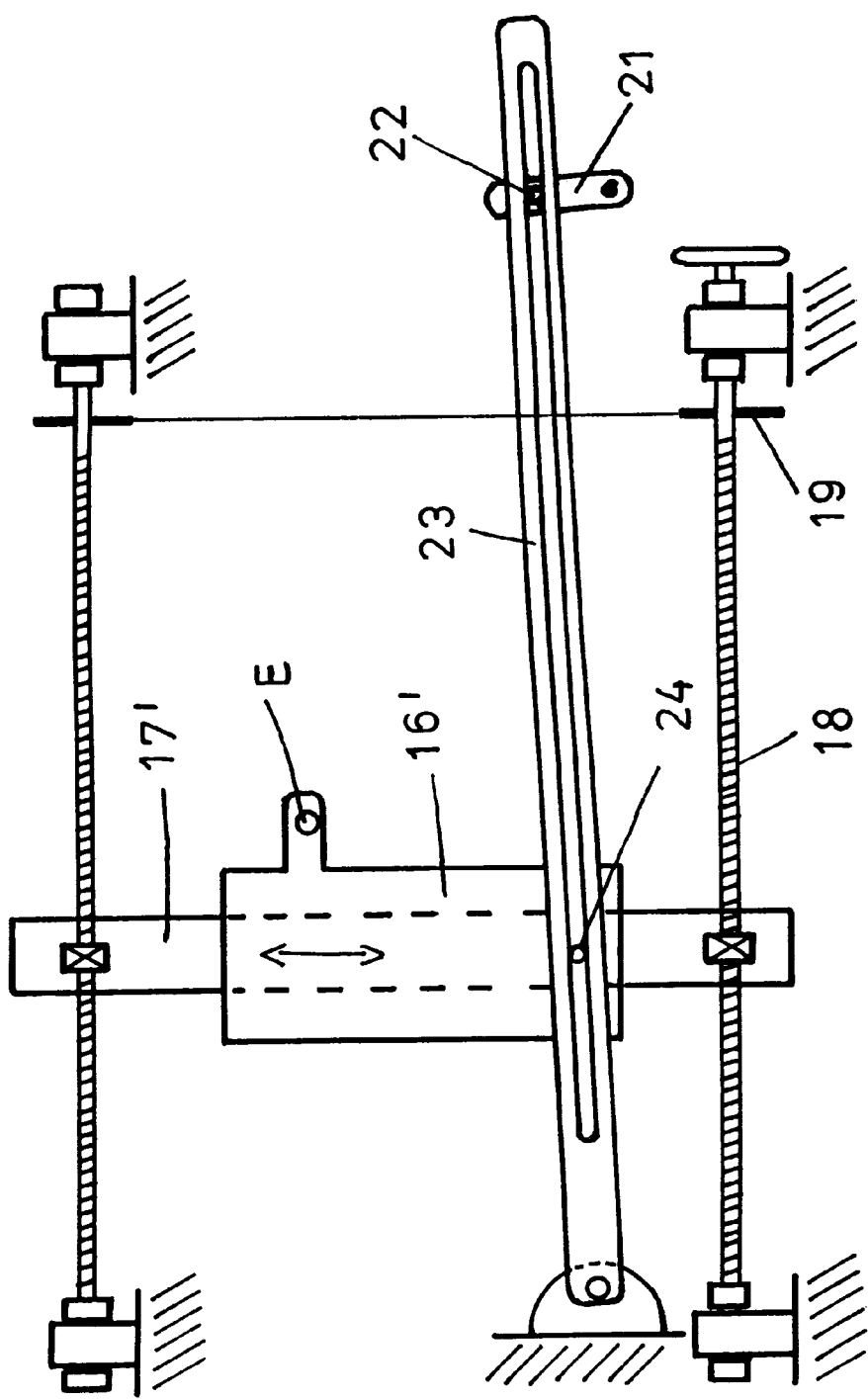
FIG. 2 is a view of schematic diagram illustrating a part of the translation device of the gear transmission according to FIG. 1a with the device according to the present invention for reducing wear.
Figure 3:
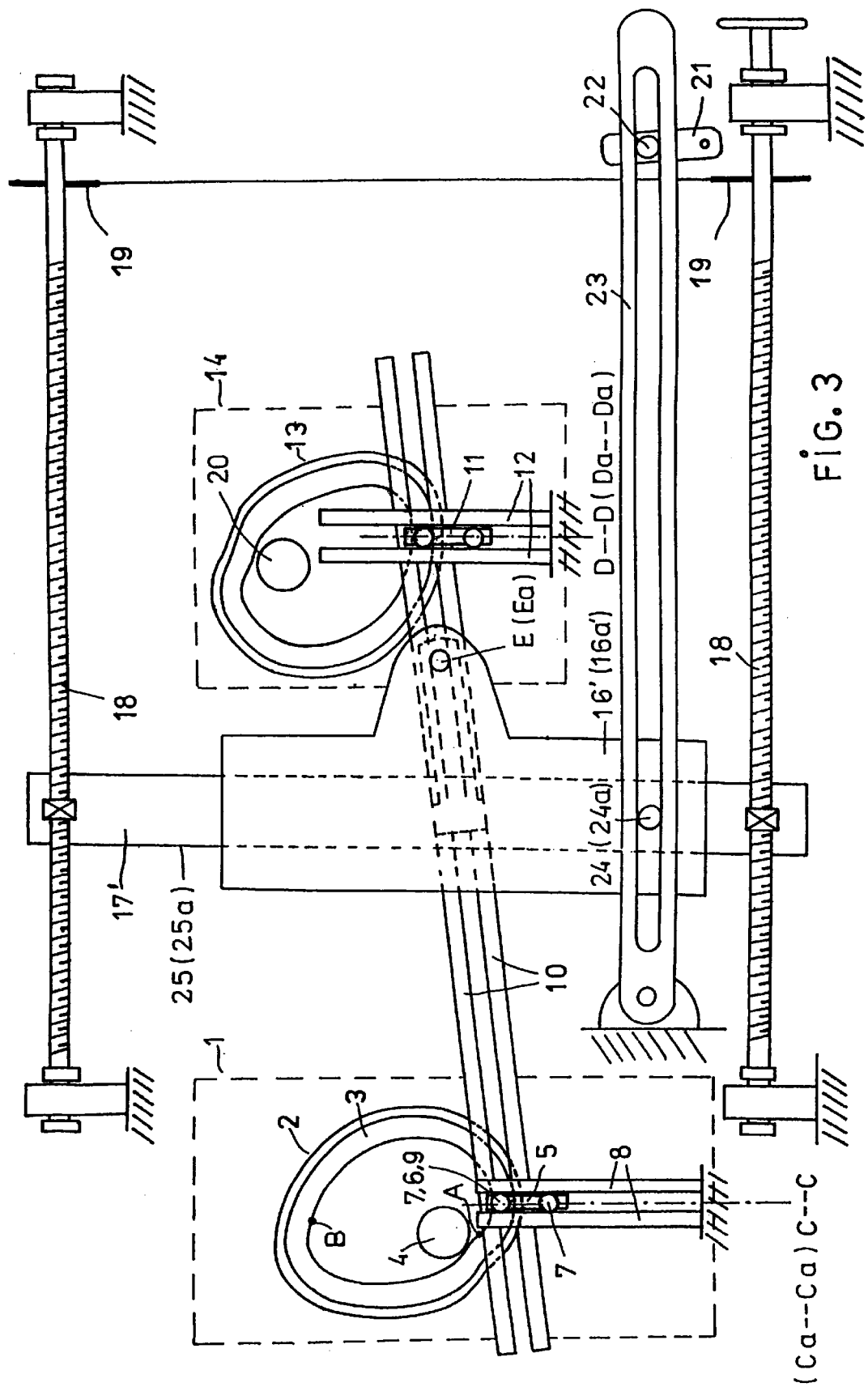
FIG. 3 is a view of a schematic diagram illustration one gear transmission unit of two gear transmission units according to FIG. 1a additionally showing a device for reducing wear.

A bearing support 16', 16a' as the part of the translation device of the gear transmission according to FIG. 1a is schematically shown in FIGS. 2 and 3, which part was furnished with the device for wear reduction according to the present invention. The bearing supports 16', 16a' are here—and in contrast to the embodiment according to FIG. 1a—disposed shiftable at the frame 17 in parallel to the guide tracks C—C, D—D of the engagement members, but the bearing supports 16', 16a' are rigidly connected to each other. The shifting can be provided by a guide track 25, 25a as shown in FIG. 4. The shifting of a bearing support does not influence the distances between the hinge point E, Ea of the lever system and the guide tracks of the engagement members, because of the parallel alignment, and does not exert an influence on the size of the translation ratio. A crank 21 rotatable supported in the casing is moved by the drive shaft through a transmission gear not illustrated here with such a large translation ratio, that the rotary speed of the crank 21 is negligibly small relative to the rotation speed of the drive shaft. The crank furnished with a follower pin 22, wherein the follower pin 22 engages into a loop 23 supported rotatable feed at the casing and incites the loop 23 to slow rotary oscillations. The loop 23 engages a follower pin 24, and a follower pin 24a attached at one of the bearing supports 16', 16a' connected to each other. The bearing support 16', 16a' is slowly shifted along its guide at the frame by the motion of the loop. The hinge point E of each of the lever systems thereby changes its position. As a consequence the regions used by the lift slider 11, 11a shift within the usable lift distance of the left side with a speed not substantially influencing the driven motion. A more uniform wear of the curve flanks as well as the guide rails of the second force transmission means and of the fourth force transmission means is thus accomplished.

The order of magnitude for the speed of the additional motion is less determined by the effect of wear reduction and more determined by possibilities of technical realization and by a still acceptable interference in the course of motion of the driven shaft by the additional motion in the context of the intended purpose of application in each case. The periodic motion of the additional device according to the present invention should be performed with a frequency in the region of from about $10^{-7}$ to $10^{-2}$ times the frequency of the rotation of the drive shaft for the simplest case of the drive of the additional device by the drive shaft.

The additional motion in the direction of the vertical arrow of FIG. 2 is generated by additional means. These additional means include for the first gear transmission unit (a) a movable bearing support 16', 16a' for a rotatable support of the lever system, wherein the movable bearing support 16', 16a' is disposed shiftable in a direction parallel to the guide tracks C—C, D—D in guides of the frame 17', wherein the frame 17' itself is moved in a direction perpendicular to the vertical arrow direction of FIG. 2 by way of the threaded spindles 18 for changing the translation ratio, and (b) an oscillating crank loop 21, 22, 23 driven by the drive shaft 4. The motion of the crank loop 21, 22, 23 effects the additional motion of the bearing support 16', 16a' based on the dog follower pin 24 attached to the bearing support 16', 16a' and engaging into the crank loop 21, 22, 23.

The embodiment of the invention described here represents only an advantageous solution variation of the problem. The transmission gear with steplessly adjustable translation includes at least two gear transmission units, which operate synchronized intermittently. Of course, more than two gear transmission units can be employed. It is decisive for constructive solutions that a more uniform material abrasion can occur over the complete usable lift distance by a continuous slow shifting of the region used for the stroke. This additional motion should however within the setting region to be used—not substantially change the size of the stroke and thus also the size of the translation.

It will be understood that each of the elements described above, or two or more together, may also find a useful application in other types of transmission system configurations and mechanical energy processing procedures differing from the types described above.

While the invention has been illustrated and described as embodied in the context of a gear transmission with stepless adjustable translation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A transmission gear with the steplessly adjustable translation comprising a drive shaft;

a driven shaft;

a first gear transmission unit including a first force transmission means connected to the drive shaft wherein the first force transmission means transforms a first uniform rotary motion of the drive shaft into a first uniform translation motion during a first force transmission phase;

a first changeable translation device connected to the first force transmission means, wherein the first changeable translation device converts the first uniform translation motion into a second uniform translation motion with a speed depending on a translation setting during the first force transmission phase while the translation setting is maintained at a defined value;

a second force transmission means connected to the first changeable translation device and wherein the second force transmission means transforms the second uniform translation motion into a second uniform rotary motion during the first force transmission phase while the translation setting is maintained at the defined value;

a first switching coupling connected to the second force transmission means and to the driven shaft, wherein the first switching coupling transfers the second uniform rotary motion to the driven shaft during the first force transmission phase while the translation setting is maintained at the defined value;

a second gear transmission unit including a third force transmission means connected to the drive shaft wherein the third force transmission means transforms the first uniform rotary motion of the drive shaft into a third uniform translation motion during a second force transmission phase;

a second changeable translation device connected to the third force transmission means, wherein the second changeable translation device converts the third uniform translation motion into a fourth uniform translation motion with a speed depending on the defined value during the second force transmission phase while the second translation setting is maintained at the second constant value;

a fourth force transmission means connected to the second changeable translation device and wherein the fourth force transmission means transforms the fourth uniform translation motion into a third uniform rotary motion during the second force transmission phase while the second translation setting is maintained at the defined value;

a second switching coupling connected to the fourth force transmission means and to the driven shaft, wherein the second switching coupling transfers the second uniform rotary motion and the third uniform rotary motion to the driven shaft;

additional means, wherein the additional means shift the region used for the second uniform translation motion within the complete stroke distance usable for the second translation motion of the second force transmission means during the running of the transmission gear with a speed influencing the driven motion only unsubstantially, wherein the rotary motion of the drive shaft is sequentially and intermittently transferred to the driven shaft by the first gear transmission unit during the first force transmission phase and, respectively, by the second gear transmission unit during the second force transmission phase.

2. The transmission gear with a stepless adjustable translation according to claim 1 further comprising means for producing additional moves including a translation set unit including a threaded spindle;

a frame parallel shiftable by way of the translation set unit and wherein the frame is fixable in a preselected position;

a first set of guide tracks disposed at the frame;

a first set of bearing supports guided by the frame in the first set of guide tracks;

a first set of lever systems having a first hinge point, wherein each one of the first set of lever systems is rotatably supported on a respective one of the first set of bearing supports and wherein each one of the first set of lever systems is furnished with first lever rails;

a first stroke element associated with the first force transmission means for engaging into the first lever rails, wherein the first stroke element is guided in a first straight line motion track;

a second stroke element associated with the second force transmission means for engaging into the first lever rails, wherein the second stroke element is guided in a second straight line motion track, wherein the first straight line motion track and the second straight line motion track are disposed parallel to each other;

wherein the frame with the first set of bearing supports is such shiftable by the translation set unit that the ratio of the distances between the first hinge point of the first set of lever systems and the first straight line motion track and the second straight line motion track is steplessly changeable;

an oscillating crank loop driven by the drive shaft for additionally moving and positioning the first set of bearing supports within the first set of guide tracks in the frame.

3. The transmission gear with a stepless adjustable translation according to claim 2, further comprising a second set of guide tracks disposed at the frame;

a second set of bearing supports guided by the frame in the second set of guide tracks;

a second set of lever systems having a second hinge point, wherein each one of the second set of lever systems is rotatably supported on a respective one of the second set of bearing supports and wherein each one of the second set of lever systems is furnished with second lever rails;

a third stroke element associated with the third force transmission means for engaging into the second lever rails, wherein the third stroke element is guided in a third straight line motion track;

a fourth stroke element associated with the fourth force transmission means for engaging into the second lever rails, wherein the fourth stroke element is guided in a fourth straight line motion track, wherein the third straight line motion track and the fourth straight line motion track are disposed parallel to each other;

wherein the frame with the second set of bearing supports is such shiftable by the translation set unit such that the ratio of the distances between the second hinge point of the second set of lever systems and the third straight line motion track and the fourth straight line motion track is steplessly changeable.

4. Transmission gear with the steplessly adjustable translation, wherein the rotary motion of a drive shaft (4) is intermittently for in each case a time interval (force transmission phase) transferred to a driven shaft (20) by at least two staggered operating gear transmission units, wherein each gear transmission unit comprises a first force transmission means (1), a changeable translation device and a second force transmission means (14) as well as an automatic switching or switching coupling and wherein—under the precondition of a just constant maintained translation setting—the first force transmission means (1) transforms the uniform rotary motion of the drive shaft (4) into a uniform translation motion during the force transmission phase, wherein the translation device converts this motion into another, also uniform translation motion (stroke) with a speed depending on the translation setting and wherein the second force transmission means (14) transforms this translation motion (stroke) into a uniform rotary motion, wherein the uniform rotary motion in turn is transferred to the driven shaft (20) through the coupling, wherein additional means are furnished which additional means shift the region used for the translated uniform translation motion within the complete stroke distance usable for this translation motion of the second force transmission means during the running of the transmission gear with a speed influencing the driven motion only unsubstantially.

5. The transmission gear with a stepless adjustable translation according to claim 4, with a translation device including a lever system, wherein the lever system is rotatably supported in a bearing support (16) led through a frame (17) and wherein the frame is parallel shiftable by way of a translation set unit with one or several threaded spindles (18) and is fixable in the preselected position, wherein the lever system is furnished with lever rails (10), wherein a stroke element of each of the two force transmission means (1, 14) engages into the lever tracks (10), wherein the stroke elements are guided in straight line motion tracks (C—C, D—D) disposed parallel to each other, wherein the frame (17) with the bearing support (16) is such shiftable by the translation set unit, that the ratio of the distances between the hinge point (E) of the lever system and the motion paths is steplessly changeable, and wherein an oscillating crank loop (21, 22, 23) driven by the drive shaft (4) additionally moves and positions the bearing support (16) within its guide track in the frame (17).

6. A transmission gear with the steplessly adjustable translation comprising a drive shaft (4);

a driven shaft (20);

a first gear transmission unit (I) including a first force transmission means (1) connected to the drive shaft wherein the first force transmission means transforms a first uniform rotary motion of the drive shaft into a first uniform rectilinear motion during a first force transmission phase;

a first changeable translation device (26) connected to the first force transmission means (1), wherein the first changeable translation device converts the first uniform rectilinear motion into a second uniform rectilinear motion with a speed depending on a chosen translation setting during the first force transmission phase while a translation setting is just maintained at a chosen value;

a second force transmission means (14) connected to the first changeable translation device (26) and wherein the second force transmission means transforms the second uniform rectilinear motion into a second uniform rotary motion during the first force transmission phase while the translation setting is just maintained at the first constant value;

a first switching or automatic switching coupling (27) connected to the second force transmission means (14) and to the driven shaft (20), wherein the first switching or automatic switching coupling (27) transfers the second uniform rotary motion to the driven shaft during the first force transmission phase while the translation setting is just maintained at the chosen value;

a second gear transmission unit (II) including a third force transmission means (1a) connected to the drive shaft (4) wherein the third force transmission means transforms the first uniform rotary motion of the drive shaft into a third uniform rectilinear motion during a second force transmission phase;

a second changeable translation device (26a) connected to the third force transmission means (1a), wherein the second changeable translation device converts the third uniform rectilinear motion into a fourth uniform rectilinear motion with a speed depending on the chosen translation setting during the second force transmission phase while the second translation setting is maintained at the chosen value;

a fourth force transmission means (14a) connected to the second changeable translation device (26a) and wherein the fourth force transmission means transforms the fourth uniform rectilinear motion into a third uniform rotary motion during the second force transmission phase while the translation setting is just maintained at the chosen value; a second switching or automatic switching coupling (27a) connected to the fourth force transmission means (14a) and to the driven shaft (20), wherein the second switching or automatic switching coupling transfers the third uniform rotary motion to the driven shaft during the second force transmission phase while the translation setting is just maintained constant at the chosen value;

means for producing additional moves (21, 22, 23, 24), wherein said means shift the region used for the second uniform rectilinear of the second force transmission means (14) during the running of the transmission gear with a speed influencing the driven motion only unsubstantially, and wherein said means shift the region used for the fourth uniform rectilinear motion within the complete stroke distance usable for the fourth uniform rectilinear motion of the fourth transmission means (14a) during the running of the transmission gear with a speed influencing the driven motion only unsubstantially and wherein the rotary motion of the drive shaft (4) is sequentially and intermittently transferred to the driven shaft (20) by the first gear transmission unit (I) during the first force transmission phase and, respectively, by the second gear transmission unit (II) during the second force transmission phase.

7. The transmission gear with a stepless adjustable translation according to claim 6 including a translation unit including at least one threaded spindle (18);

a frame (17') parallel shiftable by way of the translation set unit and wherein the frame is fixable in a preselected position;

a first set of guide tracks (25) disposed at the frame (17');

a first set of bearing supports (16') guided by the frame (17') in the first set of guide tracks (25);

a first lever system furnished with first lever rails (10) and having a first hinge point (E), wherein the first lever system is rotatably supported on the first set of bearing supports;

a first stroke element (5) associated with the first force transmission means for engaging into the first lever rails (10), wherein the first stroke element is guided in a first straight line motion track (C—C);

a second stroke element (11) associated with the second force transmission means (14) for engaging into the first lever rails (10), wherein the second stroke element is guided in a second straight line motion track (D—D), wherein the first straight line motion track and the second straight line motion track are disposed parallel to each other;

wherein the frame (17') with the first set of bearing supports (16') is such shiftable by the translation set unit that the ratio of the distances between the first hinge point of the first lever system and the first straight line motion track (C—C) and the second straight line motion track (D—D) is steplessly changeable;

means for producing additional moves including an oscillating crank loop (21, 22, 23) driven by the drive shaft (4) for additionally moving and positioning the first set of bearing supports (16') within the first set of guide tracks (25) in the frame (17').

8. The transmission gear with a stepless adjustable translation according to claim 6, further comprising a second set of guide tracks (25a) disposed at the frame (17');

a second set of bearing supports (16a') guided by the frame in the second set of guide tracks (25a);

a second lever system furnished with second lever rails (10a) and having a second hinge point (Ea), wherein the second lever system is rotatably supported on a respective one of the second set of bearing supports;

a third stroke element (5a) associated with the third force transmission means (1a) for engaging into the second lever rails (10a), wherein the third stroke element is guided in a third straight line motion track (Ca—Ca);

a fourth stroke element (11a) associated with the fourth force transmission means (14a) for engaging into the second lever rails (10a), wherein the fourth stroke element is guided in a fourth straight line motion track (Da—Da), wherein the third straight line motion track and the fourth straight line motion track are disposed parallel to each other;

wherein the frame (17') with the second set of bearing supports (16a')is such shiftable by the translation set unit that the ratio of the distances between the second hinge point (Ea) of the second lever system and the third straight line motion track (Ca—Ca) and the fourth straight line motion track (Da—Da) is steplessly changeable and wherein the means for producing additional moves (21, 22, 23, 24) are additionally moving and positioning the second set of bearing supports (16a') within the second set of guide tracks (25a) in the frame (17').

9. Transmission gear with a steplessly adjustable translation, wherein the rotary motion of a drive shaft (4) is intermittently for in each case a time interval (force transmission phase) transferred to a driven shaft (20) by at least two staggered operating gear transmission units (I,II), wherein each gear transmission unit comprises a first force transmission means (1), a changeable translation device (26) and a second force transmission means (14) as well as a switching or automatic switching coupling and wherein—under the precondition of a just constant maintained translation setting—the first force transmission means (1) transforms the uniform rotary motion of the drive shaft (4) into a uniform rectilinear motion during the force transmission phase, wherein the changeable translation device (26) converts this motion into another, also uniform rectilinear motion (stroke) into a uniform rotary motion, wherein the uniform rotary motion in turn is transferred to the driven shaft (20) through the coupling (27), wherein means for producing additional moves (21, 22, 23, 24) are furnished which additional means shifting the region used for the translated uniform rectilinear motion within the complete stroke distance usable for this rectilinear motion of the second force transmission means during the running of the transmission gear with a speed influencing the driven motion only unsubstantially.

10. The transmission gear with a stepless adjustable translation according to claim 9, with a changeable translation device (26) including a lever system, wherein the lever system is rotatably supported in a bearing support (16') led through a frame (17') and wherein the frame is parallel shiftable by way of a translation set unit with one or several threaded spindles (18) and is fixable in the preselected position, wherein the lever system is furnished with lever rails (10), wherein a stroke element of each of the two force transmission means (1, 14) engages into the lever rails (10), wherein the stroke elements are guided in straight line motion tracks (C—C, D—D) disposed parallel to each other, wherein the frame (17') with the bearing support (16') is such shiftable by the translation set unit, that the ratio of the distances between the hinge point (E) of the lever system and the motion paths is steplessly changeable, and wherein an oscillating crank loop (21, 22, 23) driven by the drive shaft (4) additionally moves and positions the bearing support (16') within its guide track in the frame (17').

11. A transmission gear with the steplessly adjustable translation comprising a drive shaft;

a driven shaft;

a first gear transmission unit including a first force transmission means connected to the drive shaft wherein the first force transmission means transforms a first uniform rotary motion of the drive shaft into a first uniform translation motion during a first force transmission phase;

a first changeable translation device connected to the first force transmission means, wherein the first changeable translation device converts the first uniform translation motion into a second uniform translation motion with a speed depending on a translation setting during the first force transmission phase while the translation setting is maintained at a defined value;

a second force transmission means connected to the first changeable translation device and wherein the second force transmission means transforms the second uniform translation motion into a second uniform rotary motion during the first force transmission phase while the translation setting is maintained at the defined value;

a first switching coupling connected to the second force transmission means and to the driven shaft, wherein the first switching coupling transfers the second uniform rotary motion to the driven shaft during the first force transmission phase while the translation setting is maintained at the defined value;

a second gear transmission unit including a third force transmission means connected to the drive shaft wherein the third force transmission means transforms the first uniform rotary motion of the drive shaft into a third uniform translation motion during a second force transmission phase;

a second changeable translation device connected to the third force transmission means, wherein the second changeable translation device converts the third uniform translation motion into a fourth uniform translation motion with a speed depending on the defined value during the second force transmission phase while the second translation setting is maintained at the second constant value;

a fourth force transmission means connected to the second changeable translation device and wherein the fourth force transmission means transforms the fourth uniform translation motion into a third uniform rotary motion during the second force transmission phase while the second translation setting is maintained at the defined value;

a second switching coupling connected to the fourth force transmission means and to the driven shaft, wherein the second switching coupling transfers the second uniform rotary motion and the third uniform rotary motion to the driven shaft;

additional means, wherein the additional means shift the region used for the second uniform translation motion within the complete stroke distance usable for the second translation motion of the second force transmission means during the running of the transmission gear with a speed influencing the driven motion only unsubstantially, wherein the rotary motion of the drive shaft is sequentially and intermittently transferred to the driven shaft by the first gear transmission unit during the first force transmission phase and, respectively, by the second gear transmission unit during the second force transmission phase.

* * * * *